May 30, 1944.     H. J. HOOD     2,350,110
LENS HOOD
Filed June 19, 1941
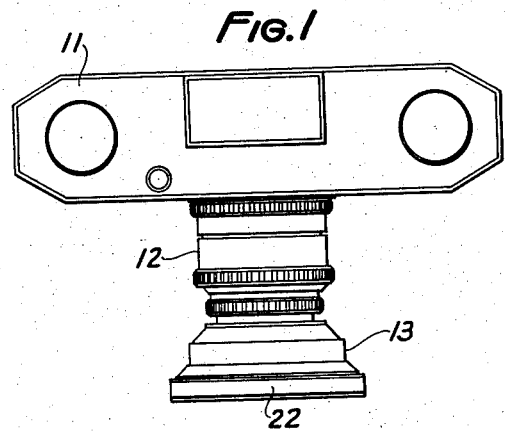
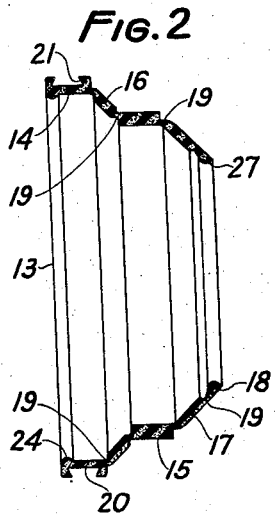
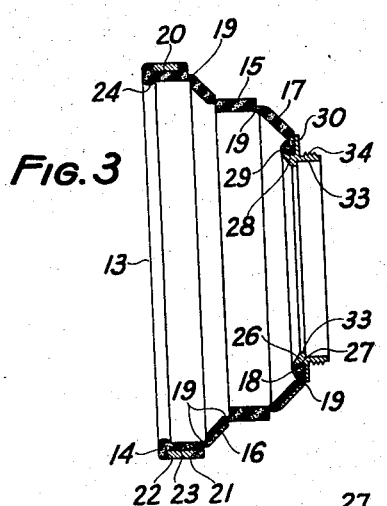
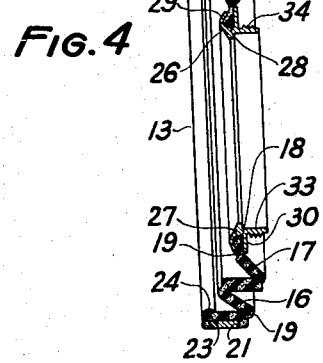
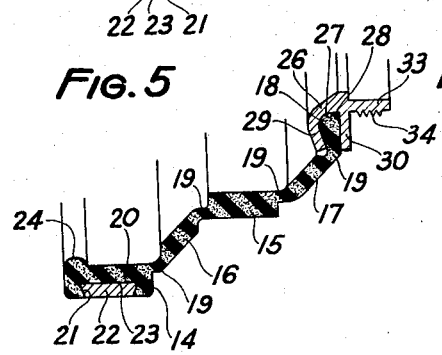
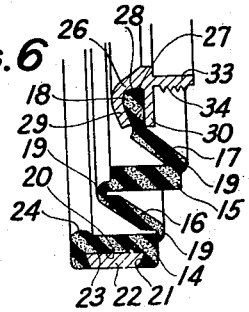
HENRY J. HOOD
INVENTOR
BY Newton M. Perrins
J. Griffin Little
ATTORNEYS Patented May 30, 1944

2,350,110

UNITED STATES PATENT OFFICE 2,350,110

LENS HOOD

Henry J. Hood, Rochester, N. Y., assignor to Eastman Kodak Company, Rochester, N. Y., a corporation of New Jersey Application June 19, 1941, Serial No. 398,789

1 Claim. (Cl. 88—1)

The present invention relates to lens hoods adapted for use with photographic cameras.

One object of the invention is the provision of an expansible and collapsible lens hood.

Another object of the invention is the provision of a lens hood of the class described which may be collapsed into a relatively flat compact unit suitable for storing or shipping yet which may be readily moved to its expanded or operative position when desired.

Still another object of the invention is the provision of a lens hood the parts of which are so proportioned that the hood will remain in either its collapsed or expanded position until positively moved therefrom.

Yet another object of the invention is the provision of a lens hood which is simple and rugged in construction, and highly effective in use.

To these and other ends, the invention resides in certain improvements and combinations of parts all as will be hereinafter more fully described, the novel features being pointed out in the claim at the end of the specification.

In the drawing:

Fig. 1 is a plan view of a camera of the roll film type, showing the relation thereto of the lens hood of the present invention;

Fig. 2 is a longitudinal sectional view through the unitary flexible members of the lens hood, showing the relation and proportions to the various parts thereof;

Fig. 3 is a longitudinal sectional view through the complete lens hood in the expanded or operative position;

Fig. 4 is a view similar to Fig. 3, and showing the lens hood in the collapsed or retracted position;

Fig. 5 is a partial view of the expanded lens hood illustrated in Fig. 3 and on a larger scale than the latter, showing in detail the relative relation and sizes of the various parts; and Fig. 6 is a view similar to Fig. 5 but with the parts folded or collapsed to form a relatively flat and compact unit.

Similar reference numerals throughout the various views indicate the same parts.

The lens hood of the present invention is shown in connection with a camera 11 provided with an objective lens mount 12 on which the lens hood, generally indicated by the numeral 13 and later more fully described, may be detachably mounted. While the hood of the present invention is shown in connection with a roll film camera of the non-folding type, this is by way of illustration only, as it is apparent that such a lens hood is adapted for use with a wide variety of camera designs.

The preferred embodiment of the lens hood is generally frusto-conical in shape, and is formed from a single piece of rubber or other suitable flexible material to provide a pair of annular members or rings 14 and 15 which extend substantially axially of the hood, and a pair of inclined members or side wall portions 16 and 17 which extend at an angle to the rings 14 and 15, as clearly shown in Fig. 2. The ring 14 is larger in diameter than the ring 15 and is spaced both radially and axially therefrom when the hood is in its extended position, as shown in Figs. 2, 3, and 5, but is arranged to overlie and to be substantially concentric therewith when the hood is collapsed, as shown in Figs. 4 and 6. The rear or small end of the wall member 17 is formed to provide a portion 18 which is in alignment with the member 17 when the hood is first formed, as shown in Fig. 2, but is then bent to extend radially when the hood is completed, as shown in Figs. 3, and 6, and to be later described.

The wall members 16 and 17 are connected to the rings 14 and 15 and the radial portion 18 by member 19 which afford, in effect, hinges by which the various members may be moved relative to each other from the expanded position shown in Fig. 3, to the collapsed position shown in Fig. 4, or vice versa. The wall members 16 and 17 are preferably, but not necessarily, thinner than the rings 14 and 15. In order to facilitate the ready collapsing and expanding of the hood, the portions 19, which form hinge connections, are, however, the thinnest in cross section so as to permit ready flexing of the portions 19 during the expanding and collapsing operation, as will be apparent from inspection of Figs. 5 and 6. The above-described hood parts are all formed from a single sheet or piece of rubber or other suitable flexible material.

When a lens hood of the type so far described is collapsed, the outer or larger annular ring 14 will slightly bulge or expand radially. When, however, the hood is released, the ring 14 will spring back to its normal diameter. This springing back of the ring 14, together with the flexibility of the hinges 19, may cause the collapsed hood parts to explode or quickly move to their expanded or operative positions, as shown in Fig. 2. This is particularly true if the ring 14 is made relatively thin in cross-section, as shown in the drawing. When such a thin ring is used, it is desirable to provide a reinforcing member for the ring so as to limit or restrict this bulging so that the hood will remain and will be self supporting in its collapsed position and will not need to be positively so held.

To secure this result, the outer surface 20 of the ring 14 is provided with a circumferential dovetail groove or slot 21 adapted to receive a similarly shaped confining ring 22 which is held in position in the slot 21 as clearly shown in Figs. 3 and 6. In order to prevent this radial or axial bulging of the ring 14 when the hood is collapsed, the inner surface 23 of the ring 22 is made of a diameter which is slightly less than the outer diameter of the surface 20 of the ring 14. While the preferred design utilizes a ring 14 of relatively thin cross-section and reinforced by the confining of ring 22, it is contemplated that the ring 14 may be made of such a thickness as not to necessitate additional reinforcing in which case the ring 22 may be eliminated. The front edge of the ring 14 may be provided with an annular bead 24 which acts as a baffle to reduce the reflection of light rays from the inner surface of the hood.

A second confining ring 26 rests on the inner annular edge 27 of the radial portion 18. The outer surface 28 of the ring 26 is of a diameter slightly greater than that of the edge 27, and thus tends to slightly push or urge the portion 18 outwardly, or radially. The net result is that when the hood is folded, the portion 18 will be maintained in a substantially radial position, as shown in Fig. 6, so that the flexibility of the portion 17 and the hinge 19 between the latter and the portion 18 will not tend to move the portion 18 to the right, as shown in Fig. 6, but will enable the portion 18 to remain in its radial position, the advantages of which will be readily apparent. The confining ring 26 thus cooperates with the first confining ring 22 to releasably retain the lens hood in the collapsed position without being positively so held.

The confining ring 26 is provided with a pair of spaced annular flanges 29 and 30 which extend outwardly and are arranged to be pressed into clamping relation with the sides of the portion 18 to securely retain the ring 26 thereto. An annular mounting ring 33 projects axially from the confining ring 26 and is adapted to be detachably mounted on the lens mount 12 to secure the lens hood thereto. In the present embodiment, the outer surface of the ring 33 may be threaded, as shown at 34, to engage similar threads on the lens hood 12. It is contemplated, however, that the surface of the ring 33 may be smooth so as to slidably engage the lens mount 12.

It is apparent from an inspection of Fig. 5 that when the hood 13 is in the erected position, the connecting wall members 16 and 17 are inclined to the right of the vertical, as shown in Fig. 5. However, when the hood is collapsed, the members 16 and 17 are inclined to the left of the vertical, as shown in Fig. 6. The members 16 and 17 are thus inclined in opposite directions when folded, Fig. 6, and when expanded, Fig. 5. Furthermore, when being folded, the members 16 and 17 pass through and beyond the vertical or dead-center position, so that when the hood is collapsed the members 16 and 17 have passed beyond the dead-center position and are, in effect, locked in the collapsed position. By thus swinging the wall members 16 and 17 beyond their dead-center position, the hood parts are self-supporting in either the collapsed or expanded positions and need not be positively so held, as in prior forms of collapsible hoods.

The present invention thus provides a lens hood which may be readily collapsed into a small compact unit, and which will remain in the collapsed position without being positively held, yet which may be readily and easily moved to the expanded or operative position when so desired in which position it will also remain.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claim.

I claim:

A collapsible lens hood comprising a bellows-like member formed to provide a plurality of concentric cylindrical portions of different diameters, inclined portions of decreasing mean diameter connected to said cylindrical portions, the smallest of said inclined portions terminating in a radially extending portion, said portions being relatively movable to collapse said hood, a confining ring mounted on and of slightly less diameter than the cylindrical portion of largest diameter, and a second confining ring mounted on and of slightly greater diameter than said radial portion and cooperating with said first ring to maintain said portions in self-supporting relation when said hood is collapsed.

HENRY J. HOOD.